United States Patent
Ono et al.

(10) Patent No.: US 11,565,341 B2
(45) Date of Patent: Jan. 31, 2023

(54) MANUFACTURING METHOD OF DIFFERENTIAL DEVICE

(71) Applicant: AISIN CORPORATION, Kariya (JP)

(72) Inventors: Hiroyuki Ono, Aichi (JP); Yusuke Suzuki, Aichi (JP)

(73) Assignee: AISIN CORPORATION, Kariya (JP)

(*) Notice: Subject to any disclaimer, the term of this patent is extended or adjusted under 35 U.S.C. 154(b) by 564 days.

(21) Appl. No.: 16/620,233

(22) PCT Filed: Aug. 15, 2018

(86) PCT No.: PCT/JP2018/030321
§ 371 (c)(1),
(2) Date: Dec. 6, 2019

(87) PCT Pub. No.: WO2019/044502
PCT Pub. Date: Mar. 7, 2019

(65) Prior Publication Data
US 2021/0079993 A1     Mar. 18, 2021

(30) Foreign Application Priority Data
Aug. 31, 2017 (JP) .............................. JP2017-168087

(51) Int. Cl.
*B23K 15/00* (2006.01)
*B23K 26/21* (2014.01)
(Continued)

(52) U.S. Cl.
CPC .......... *B23K 15/0073* (2013.01); *B23K 26/21* (2015.10); *B23K 26/28* (2013.01);
(Continued)

(58) Field of Classification Search
CPC ...... B23K 26/21; B23K 26/28; B23K 26/211; B23K 26/242; B23K 26/32;
(Continued)

(56) References Cited

FOREIGN PATENT DOCUMENTS

| JP | 2011-117540 A | 6/2011 | |
| JP | 2013-018035 A | 1/2013 | |
| WO | WO-2007085848 A1 * | 8/2007 | ............ B23K 26/28 |

OTHER PUBLICATIONS

International Search Report for PCT/JP2018/030321 dated Oct. 2, 2018.
Written Opinion for PCT/JP2018/030321 dated Oct. 2, 2018.

* cited by examiner

*Primary Examiner* — David P Bryant
*Assistant Examiner* — Christine Bersabal
(74) *Attorney, Agent, or Firm* — Sughrue Mion, PLLC

(57) ABSTRACT

A first abutting surface, a first welding surface, a first facing surface are formed in a differential case. A second abutting surface, a second welding surface, and a second facing surface are formed in a differential ring gear. In an installing step, the first abutting surface and the second abutting surface are inserted, positions of the differential case and the differential ring gear are determined in an axial direction, a separation portion that spaces the first welding surface and the second welding surface away from each other and that has a non-linear portion is formed, and a void is formed between the first facing surface and the second facing surface. In a welding step, a laser is irradiated to the separation portion and the first welding surface and the second welding surface are welded.

8 Claims, 6 Drawing Sheets

(51) Int. Cl.
*F16H 48/38* (2012.01)
*B23P 15/00* (2006.01)
*B23K 26/28* (2014.01)

(52) U.S. Cl.
CPC .............. *B23P 15/00* (2013.01); *F16H 48/38* (2013.01); *F16H 2048/382* (2013.01)

(58) Field of Classification Search
CPC .......... B23K 15/0073; B23K 2101/006; B23K 2101/008; B23K 2103/04; B23K 33/006; B23K 33/008; B23P 15/00; B23P 15/0093; F16H 48/38; F16H 48/40; F16H 2048/382; F16H 2048/385
See application file for complete search history.

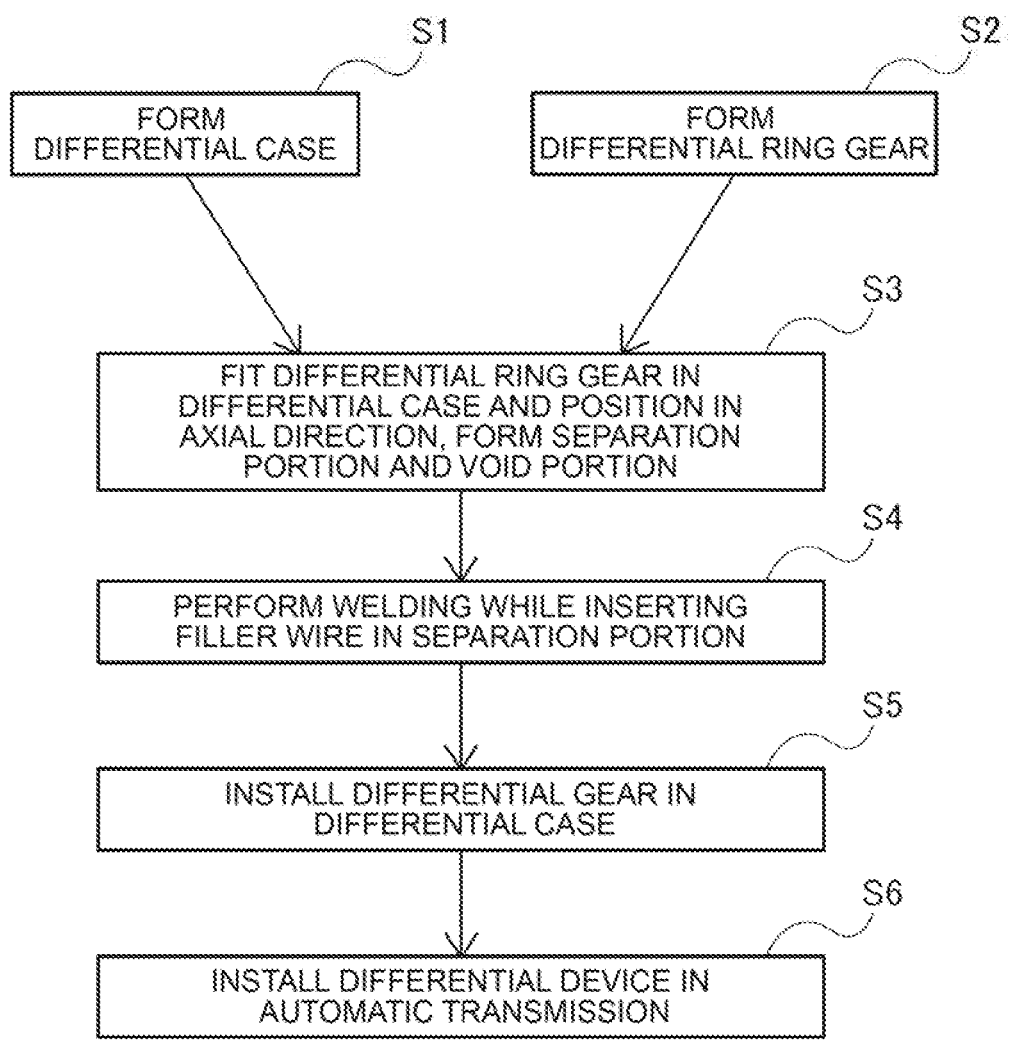

MANUFACTURING METHOD OF DIFFERENTIAL DEVICE

CROSS REFERENCE TO RELATED APPLICATIONS

This Application is a National Stage Of International Application No. PCT/JP2018/030321 filed Aug. 15, 2018, claiming priority based on Japanese Patent Application No. 2017-168087 filed Aug. 31, 2017.

TECHNICAL FIELD

The technique relates to a manufacturing method of a differential device that is installed in a vehicle etc.

BACKGROUND ART

Conventionally, a differential device is installed in a vehicle etc. so as to absorb a rotational difference between left and right wheels when turning or to absorb a rotational difference between front wheels and rear wheels, for example. In general, the differential device is configured to input a rotation output from a transmission mechanism to a differential ring gear, transmit the rotation from the differential ring gear to a differential case that houses a differential mechanism, and transmit the rotation to a pair of output members while absorbing a differential rotation of the output members with the differential mechanism.

When manufacturing the above differential device, the differential case and the differential ring gear are formed separately and then the two are integrally fixed. If the differential case and the differential ring gear are fastened by a bolt etc., the size is increased to ensure the strength, which prevents the size from being reduced. Thus, a method of fixing the differential case and the differential ring gear by welding is often used. When fixing the differential ring gear to the differential case by welding, the welding strength needs to be ensured while a good position accuracy of the differential ring gear with respect to the differential case is maintained, that is, the welding needs to be performed with thermal deformation and welding quality in consideration.

There is know a press-in portion in which the differential ring gear is pressed in the differential case, a clearance of a prescribed distance is provided in a welding portion, and welding is performed by laser welding while a welding wire is inserted in the clearance (see Patent Document 1). In the invention of Patent Document 1, a void is provided between the press-in portion and the welding portion and it is possible to discharge gas generated during welding while releasing the gas in a circumferential direction without confining the gas. It is thus possible to prevent the generated gas from dissolving in the welding portion and the welding quality is improved.

RELATED ART DOCUMENTS

Patent Documents

Patent Document 1: Japanese Patent Application Publication No. 2013-18035 (JP 2013-18035A)

SUMMARY OF THE DISCLOSURE

Problem to be Solved by Various Aspects of the Disclosure

However, in the invention disclosed in Patent Document 1 described above, if a laser hits a press-in portion and the press-in portion is melted when laser welding is performed, a position accuracy of the differential ring gear becomes unsatisfactory and it is difficult to irradiate the laser in parallel to the clearance. As illustrated in FIGS. 5 and 6 etc. in Patent Document 1 for example, the laser is irradiated so as to be inclined with respect to a direction in which the clearance of the welding portion is formed. It is therefore difficult to perform welding to a deep end of the welding portion and there is a problem that it is difficult to ensure a welding strength.

An aspect of the present disclosure is to provide a manufacturing method of a differential device in which welding can be performed while discharging a gas generated during welding and a welding strength can be ensured.

Means for Solving the Problem

A manufacturing method of a differential device, the differential device including: a differential case that houses a differential mechanism drivingly coupled to an output shaft and that has a first abutting surface disposed so as to extend in an axial direction, a first welding surface disposed along an entire circumference, and a first facing surface disposed on a downstream side in an irradiating direction of an energy beam with respect to the first welding surface so as to extend along the entire circumference; and a differential ring gear that is welded by the energy beam on an outer peripheral side of the differential case and that has a second abutting surface disposed so as to extend in the axial direction, a second welding surface disposed along the entire circumference and disposed so as to face the first welding surface, a second facing surface disposed on the downstream side in the irradiating direction with respect to the second welding surface so as to extend along the entire circumference and face the first facing surface, the manufacturing method of the differential device comprising:

an installing step of inserting the first abutting surface and the second abutting surface while relatively moving the first abutting surface and the second abutting surface in the axial direction, determining positions of the differential case and the differential ring gear in the axial direction, installing the differential case and the differential ring gear so that a separation portion is formed so that the first welding surface and the second welding surface are spaced away from each other and so as to have a non-linear portion that has a non-linear shape in a section passing through an axial center, and installing the differential case and the differential ring gear so that a void is formed between the first facing surface and the second facing surface that are spaced away from each other by a distance larger than that of the separation portion and is in communication with the separation portion; and a welding step of irradiating the energy beam to the separation portion and welding the first welding surface and the second welding surface.

In this way, the separation portion is formed between the first welding surface and the second welding surface, the void that is in communication with the separation portion is formed on the inner peripheral side of the separation portion, and the first welding surface and the second welding surface are welded. Thus, it is possible to cause the gas generated during welding to pass through the separation portion from the void to be discharged outside, prevent the gas from dissolving in the welding portion, and improve the welding quality. Since the separation portion is formed to have a non-linear shape, even if the energy beam is irradiated generally in parallel to the separation portion for example, it is possible to prevent the energy beam from passing through the separation portion and hitting the first abutting surface and the second abutting surface, and make sure the energy beam stays in the separation portion to ensure heat quantity. This makes it possible to perform welding to the deep end of the separation portion and ensure the welding strength.

BRIEF DESCRIPTION OF THE DRAWINGS

FIG. 6 illustrates a flowchart of a manufacturing process of the differential device according to the embodiment.

DETAILED DESCRIPTION

Figure 1:
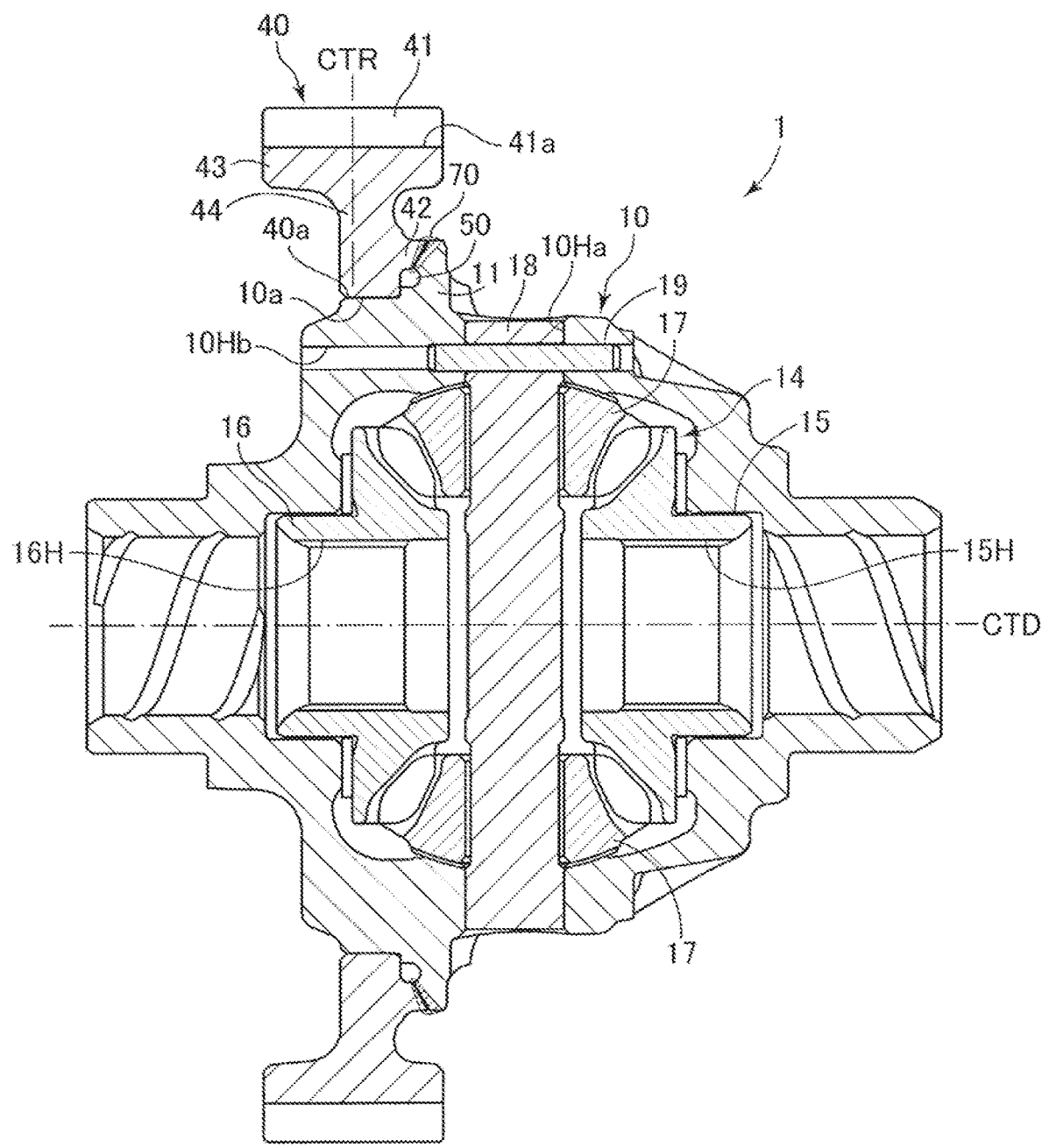
FIG. 1 illustrates a sectional view of a differential device according to an embodiment.
Figure 2:
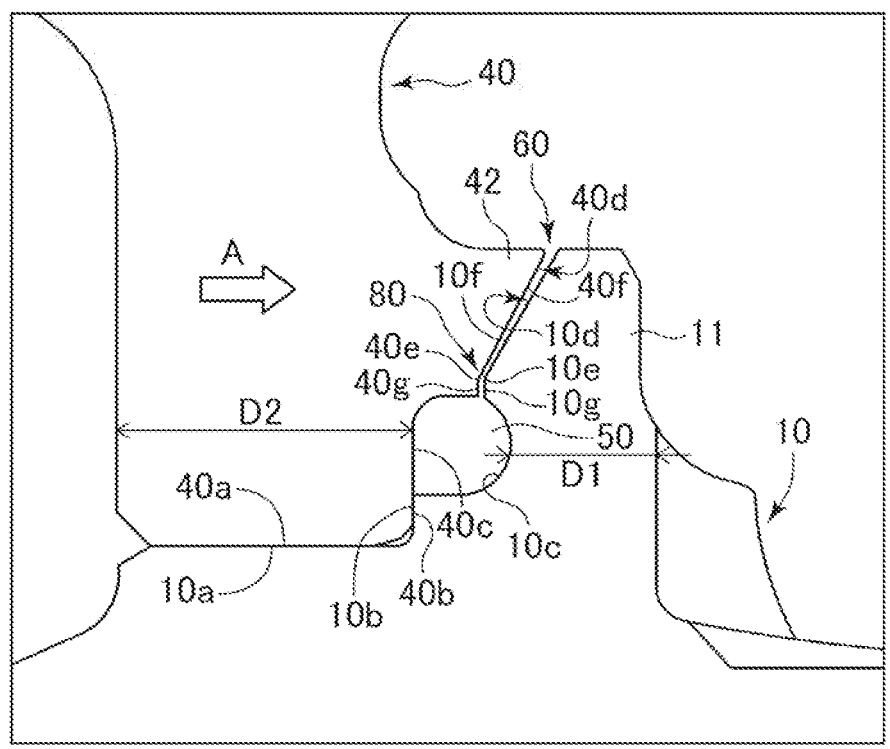
FIG. 2 illustrates an enlarged sectional view of an installing portion of a differential case and a differential ring gear according to the embodiment.
Figure 3:
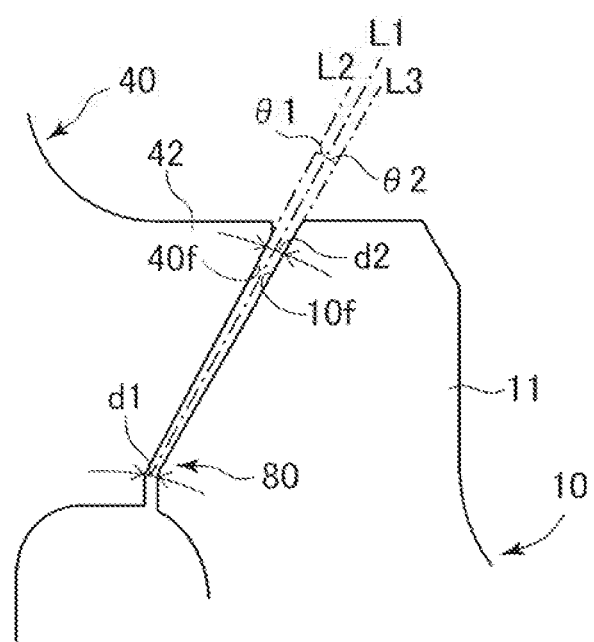
FIG. 3 illustrates an enlarged sectional view of a separation portion according to the embodiment.
Figure 4:
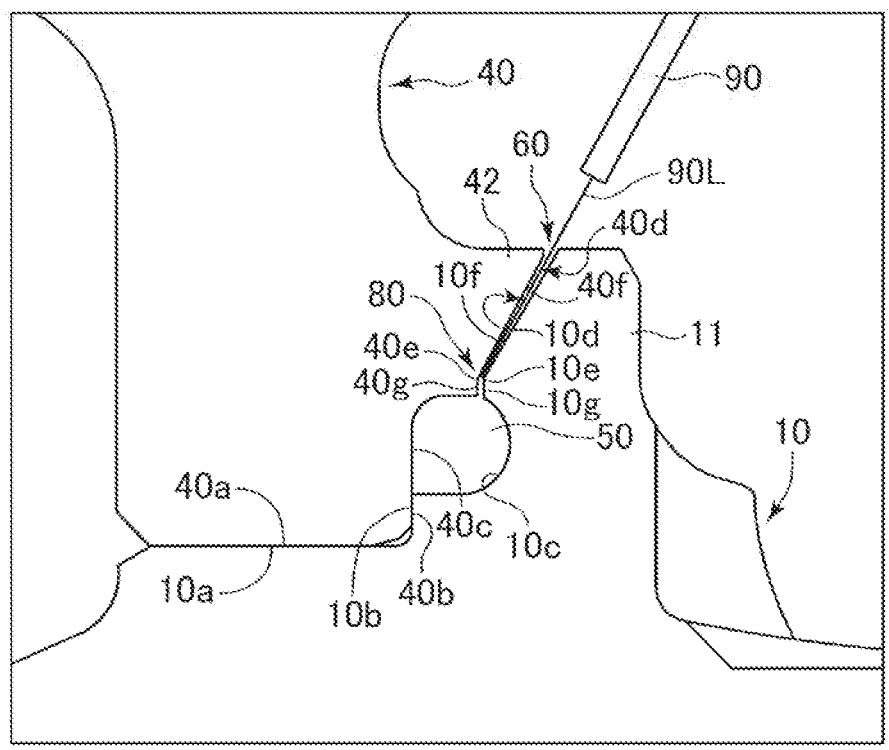
FIG. 4 illustrates an enlarged sectional view of the differential case and the differential ring gear during welding according to the embodiment.
Figure 5:
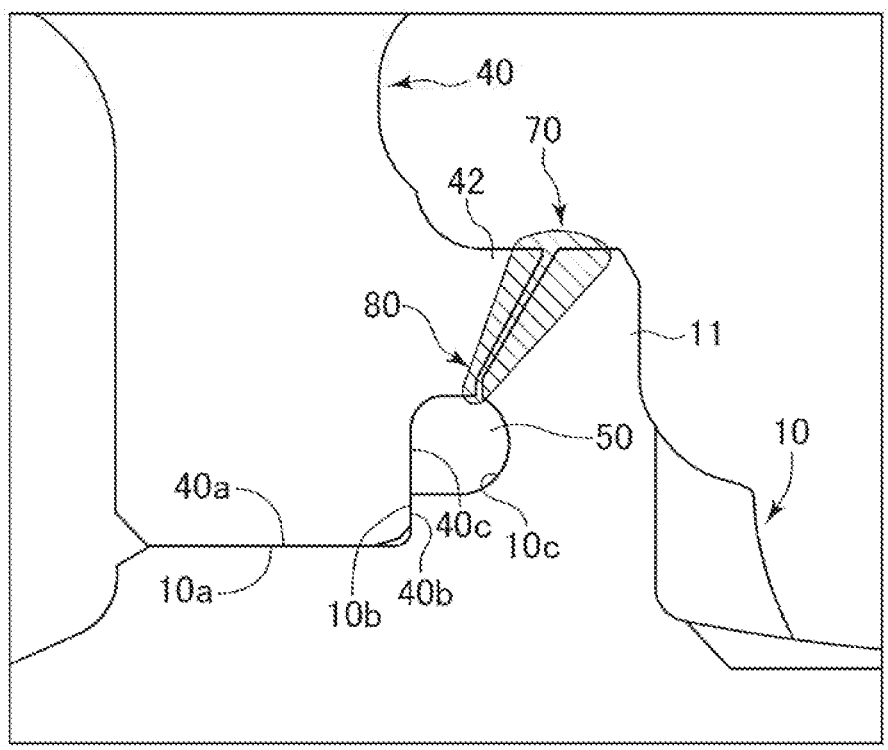
FIG. 5 illustrates an enlarged sectional view of a welding portion of the differential case and the differential ring gear after welding according to the embodiment.

Hereinafter, a differential device according to an embodiment will be described with reference to FIGS. 1 to 6. FIG. 1 illustrates a sectional view of a differential device according to the embodiment. FIG. 2 illustrates an enlarged sectional view of an installing portion of a differential case and a differential ring gear according to the embodiment. FIG. 3 illustrates an enlarged sectional view of a separation portion according to the embodiment. FIG. 4 illustrates an enlarged sectional view of the differential case and the differential ring gear during welding according to the embodiment. FIG. 5 illustrates an enlarged sectional view of a welding portion of the differential case and the differential ring gear after welding according to the embodiment. FIG. 6 illustrates a flowchart of a manufacturing process of the differential device according to the embodiment.

[Overall Structure of Differential Device]

A differential device 1 according to the embodiment is provided in an automatic transmission (not shown) that is installed in a vehicle, such as an FF (front engine, front drive) type vehicle, in which an engine output shaft is arranged laterally with respect to a vehicle traveling direction. The differential device 1 is configured so that a rotation from a counter shaft of a transmission mechanism of the automatic transmission is shifted by the transmission mechanism and is transmitted to a differential ring gear 40 described below.

Specifically, as illustrated in FIG. 1, the differential device 1 is configured including the differential ring gear 40, a differential case 10 to which the differential ring gear 40 is fixed, and a differential mechanism 14 housed in the differential case 10, in general. The differential ring gear 40 is formed to have a cylindrical shape in which a center is a center CTD of left and right drive shafts in an axial direction, the left and right drive shafts being output shafts not shown. The differential ring gear 40 is configured including a tooth portion 43 provided with a tooth surface 41 on an outer peripheral side, a hollow disk-shaped portion 44 formed to have a hollow disk shape that extends along an inner peripheral side of the tooth portion 43 with a thickness that is shorter than the length of the tooth portion 43 in the axial direction, and an extending portion 42 that extends from the hollow disk-shaped portion 44 in the axial direction. The differential ring gear 40 is thus configured to have a T shape in a sectional view due to the tooth portion 43 and the hollow disk-shaped portion 44.

The tooth surface 41 described above is formed of a helical gear, configured so as to mesh with a counter shaft not shown, and configured so that a tooth bottom 41a that is recessed between a plurality of teeth is at a position that is on an innermost peripheral side. The tooth surface 41 after the differential ring gear 40 and the differential case 10 are fixed is positioned so that the center CTR in the axial direction overlaps with a second abutting surface 40a described below in the axial direction when seen in a radial direction. The tooth surface 41 is configured so that even when a thrust force in the axial direction acts on the tooth surface 41, the differential ring gear 40 can be suppressed from being inclined. The differential ring gear 40 is welded at a welding portion 70 described in detail below so that the differential ring gear 40 is integrally fixed to the differential case 10.

The differential case 10 is configured as a hollow cylindrical case that houses the differential mechanism 14. The differential case 10 is configured including, in an upper part not shown, an opening portion that allows the differential mechanism 14 to be installed. On an outer peripheral side of the differential case 10, a flange portion 11 is formed so as to extend toward the outer peripheral side in a flange shape so as to face the differential ring gear 40. In the differential case 10, a bearing not shown is interposed between the differential case 10 and a case of an automatic transmission, that is, the differential case 10 is supported so as to be rotatable with respect to the case of the automatic transmission.

The differential mechanism 14 described above is configured including a pinion shaft 18 that is inserted in a shaft hole 10Ha and that is retained by a pin 19 inserted in a pin hole 10Hb, two pinion gears 17 that are supported by the pinion shaft 18 so as to be rotatable, and side gears 15, 16 serving as a pair of output members that each mesh with the pinion gears 17. The side gears 15, 16 are each supported by the differential case 10 so as to be rotatable. The side gears 15, 16 are provided with fitting holes 15H, 16H to which a driveshaft not shown is fitted, that is, the side gears 15, 16 are drivingly coupled to the left and right wheels via the drive shaft.

In the differential device 1 configured as described above, the differential ring gear 40 is integrally fixed and coupled to the differential case 10. Thus, when the differential ring gear 40 receives an input of rotation, the differential case 10 rotates as it is and the pinion shaft 18 is rotated integrally with the differential case 10. As well as causing the pinion gears 17 to revolve, the pinion shaft 18 absorbs a differential rotation while rotating with the pinion shaft 18 as the center when a differential rotation is generated in the side gears 15, 16. The pinion shaft 18 accordingly transmits the revolution of the pinion gears 17 to the side gears 15, 16. In this way, the rotation is transmitted to the left and right wheels via the drive shaft not shown.

[Detailed Configuration of Installing Portion of Differential Case and Differential Ring Gear]

As illustrated in FIG. 2, on the outer peripheral side of the differential case 10, a first abutting surface 10a, a restricting portion 10b, a first facing surface 10c, and a first welding surface 10d are formed, in general. The first abutting surface 10a is formed as a circumferential surface extending in the axial direction. A second abutting surface 40a of the differential ring gear 40 described below is inserted in a form of press fitting, that is, the second abutting surface 40a is fitted to the first abutting surface 10a. The restricting portion 10b is extended linearly and perpendicular to the axial direction, from an end portion of the first abutting surface 10a toward the outer peripheral side in the radial direction, and is formed in a stepped shape from the first abutting surface 10a. In this way, the restricting portion 10b restricts the differential ring gear 40 from moving toward one side in the axial direction when an abutting portion 40b of the differential ring gear 40 described below abuts against the restricting portion 10b.

The first facing surface 10c and the first welding surface 10d are formed on the flange portion 11 that extends in a flange shape toward the outer peripheral side, on the opposite side of the restricting portion 10b from the first abutting surface 10a. The first welding surface 10d is positioned at a distal end portion of the flange portion 11. The first welding surface 10d is formed so as to extend along the entire circumference in the circumferential direction and face the radial direction. That is, the first welding surface 10d is formed so as to extend inclined with respect to the radial direction that is perpendicular to the axial direction, and so that the surface faces the outer peripheral side. The first welding surface 10d is positioned so as to face the second welding surface 40d of the differential ring gear 40 described below. The first welding surface 10d is formed so as to include a first planar portion 10f, a first bent portion 10e, and a first end portion planar surface 10g. The first planar portion 10f has a planar shape and is provided on an upstream side in an irradiating direction of a laser described below, that is, on the outer peripheral side. The first bent portion 10e is provided on a downstream side of the first planar portion 10f in the irradiating direction of the laser, that is, on the inner peripheral side of the first planar portion 10f, and is bent in the radial direction that is perpendicular to the axial direction with respect to the first planar portion 10f The first end portion planar surface 10g is provided on the inner peripheral side of the first bent portion 10e and extends in a planar shape in the radial direction that is perpendicular to the axial direction. The first end portion planar surface 10g forms an end portion on the inner peripheral side of the first welding surface 10d.

The first facing surface 10c is formed on a side face on the first abutting surface 10a side of the flange portion 11 in the axial direction and the restricting portion 10b. The first facing surface 10c is provided so as to extend along the entire circumference in the circumferential direction on the inner peripheral side with respect to the first welding surface 10d and is provided on the inner side of the flange portion 11 in the axial direction. The first facing surface 10c is formed so as to be recessed in an arc shape toward the inner side of the flange portion 11 from the end portion on the inner peripheral side of the first welding surface 10d. The first facing surface 10c is positioned so as to face a second facing surface 40c of the differential ring gear 40 described above.

The differential ring gear 40 is provided with the second abutting surface 40a, the abutting portion 40b, the second facing surface 40c, and the second welding surface 40d, in general. The second abutting surface 40a is formed on the inner peripheral side of the hollow disk-shaped portion 44 described above and is fitted to the first abutting surface 10a of the differential case 10. The abutting portion 40b is formed by a part of the side face of the hollow disk-shaped portion 44 on the differential case 10 side. The abutting portion 40b is formed immediately on the outer peripheral side of the second abutting surface 40a in a part on the inner peripheral side so as to extend along the entire circumference in the circumferential direction and in the radial direction that is perpendicular to the axial direction.

The second facing surface 40c is a surface that faces the first facing surface 10c so as to form a void 50 as described in detail below. The second facing surface 40c is formed by a part of the side face of the hollow disk-shaped portion 44 on the differential case 10 side, that is, the second facing surface 40c includes a planar that is continuously connected to the abutting portion 40b. The second facing surface 40c is positioned on the outer peripheral side of the abutting portion 40b and the inner peripheral side of the second welding surface 40d. In other words, the second facing surface 40c is formed between the abutting portion 40b and the inner peripheral side of the second welding surface 40d of the distal end portion of the extending portion 42 described above. The second facing surface 40c is formed so as not to be recessed toward the second abutting surface 10a side in the axial direction, that is, the inner side of the hollow disk-shaped portion 44. The second facing surface 40c is formed so that a minimum thickness D1 in the axial direction, of a part in which the first facing surface 10c of the flange portion 11 is formed, is less than a minimum thickness D2 in the axial direction, of a part in which the second facing surface 40c of the hollow disk-shaped portion 44 is formed.

The second welding surface 40d is formed in the distal end portion of the extending portion 42. The second welding surface 40d is formed so as to extend along the entire circumference in the circumferential direction and face in the radial direction. That is, the second welding surface 40d is formed so as to extend inclined with respect to the radial direction that is perpendicular to the axial direction, and so that the surface faces the inner peripheral side. The second welding surface 40d is positioned so as to face the first welding surface 10d of the differential case 10. The second welding surface 40d is formed so as to include a second planar portion 40f, a second bent portion 40e, and a second end portion planar surface 40g. The second planar portion 40f has a planar shape and is provided on the upstream side in the irradiating direction of the laser described below, that is, on the outer peripheral side. The second bent portion 40e is provided on the downstream side of the second planar portion 40f in the irradiating direction of the laser, that is, on the inner peripheral side of the second planar portion 40f, and is bent in the radial direction that is perpendicular to the axial direction with respect to the second planar portion 40f The second end portion planar surface 40g is provided on the inner peripheral side of the second bent portion 40e and extends in a planar shape in the radial direction that is perpendicular to the axial direction. The second end portion planar surface 40g forms an end portion on the inner peripheral side of the second welding surface 40d.

The first welding surface 10d and the second welding surface 40d that are formed as described above form a separation portion 60 in which the first welding surface 10d and the second welding surface 40d are spaced away from each other in the axial direction when the differential case 10 and the differential ring gear 40 are installed. In the separation portion 60, a non-linear portion 80 that has a non-linear shape from the upstream side to the downstream side in the irradiating direction of the laser in a section passing through the center CTD is formed, so that the laser cannot pass through due to the first bent portion 10e and the second bent portion 40e. In this way, when the laser is irradiated, the laser is prevented from hitting the void 50, specifically the second facing surface 40c. As a matter of course, the laser does not hit the first abutting surface 10a and the second abutting surface 40a.

As shown in FIG. 3, when the differential case 10 and the differential ring gear 40 are installed, in the separation portion 60, a virtual line L2 that extends from the first planar portion 10f and a virtual line L3 that extends from the second planar portion 40f are inclined at an angle θ1 and an angle θ2, respectively, with respect to an intermediate line L1. That is, the first planar portion 10f and the second planar portion 40f are opened toward the outer peripheral side at an angle acquired by adding the angle θ1 and the angle θ2. The first planar portion 10f and the second planar portion 40f are formed so that a distance d2 is larger than a distance d1. Here, the distance d1 is a distance on the downstream side in the irradiating direction of the laser and is the distance over which the first planar portion 10f and the second planar portion 40f are spaced away from each other at the non-linear portion 80. The distance d2 is a distance on the upstream side, over which the first planar portion 10f and the second planar portion 40f are spaced away from each other. The angle θ1 and the angle θ2 are set at a maximum angle of a manufacturing error when forming the first planar portion 10f or the second planar portion 40f. For example, when the maximum angle of the manufacturing error is one degree and the first planar portion 10f and the second planar portion 40f come closer to each other by one degree each, the first planar portion 10f and the second planar portion 40f become parallel to each other. This prevents the outer peripheral side from becoming narrower than the inner peripheral side in the separation portion 60.

[Manufacturing Process of Differential Device]

A manufacturing process of the differential device 1 will be described with reference to FIGS. 2 to 6. As illustrated in FIG. 6, the flange portion 11 is formed as the differential case 10 and is then machined to the shapes of the first abutting surface 10a, the restricting portion 10b, the first facing surface 10c, and the first welding surface 10d etc. The differential case 10 illustrated in FIG. 2 that has the shape described above is thus formed (S1, differential case forming step). The tooth portion 43, the hollow disk-shaped portion 44, and the extending portion 42 are formed as the differential ring gear 40 and are then machined to the shapes of the tooth surface 41, the second abutting surface 40a, the abutting portion 40b, the second facing surface 40c, and the second welding surface 40d etc. The differential ring gear 40 illustrated in FIG. 2 that has the shape described above is thus formed (S2, differential ring gear forming step).

The second abutting surface 40a of the differential ring gear 40 is then press fitted to the first abutting surface 10a of the differential case 10 in the axial direction indicated by an arrow A in FIG. 2. The abutting portion 40b is then abutted against the restricting portion 10b and relative positions of the differential case 10 and the differential ring gear 40 are positioned in the axial direction. As illustrated in FIG. 2, the separation portion 60 including the non-linear portion 80 is formed between the first welding surface 10d and the second welding surface 40d. The void 50 is provided on the inner peripheral side of the separation portion 60 so as to be in communication with the separation portion 60 and is formed between the first facing surface 10c and the second facing surface 40c (S3, installing step).

As illustrated in FIG. 4, while inserting a filler wire serving as a filler material in the separation portion 60, an irradiator 90 is provided on the outer peripheral side of the separation portion 60 and is set so that the intermediate line L1 between the first planar portion 10f and the second planar portion 40f (see FIG. 3) is in parallel with an axial line of a laser 90L serving as an energy beam. The laser 90L is irradiated so as to pass through between the first planar portion 10f and the second planar portion 40f and hit the non-linear portion 80. The irradiator 90 or the differential case 10 and the differential ring gear 40 are rotated in the circumferential direction. The separation portion 60 is welded along the entire circumference (S4, welding step).

In this way, as illustrated in FIG. 5, the separation portion 60 is filled with the filler material while the vicinity of the first welding surface 10d and the second welding surface 40d are melted. The welding portion 70 is formed and the differential case 10 and the differential ring gear 40 are integrally fixed. The non-linear portion 80 is provided in the separation portion 60 and is formed in a deep end of the separation portion 60, that is, near an outlet of the separation portion 60 that is on the downstream side in the irradiating direction of the laser. Thus, the entire separation portion 60 is surely overheated by the laser 90L without the laser 90L passing through the separation portion 60 and causing underheating, and it is thus possible to perform welding to the deep end of the separation portion 60.

When welding is performed, a gas is generated due to welding. However, the gas passes through the separation portion 60 into the void 50 and the gas passes through the separation portion 60 that has not been welded yet to escape outside. The gas is thus prevented from dissolving in the welding portion and the welding quality is improved. Since the separation portion 60 is welded along the entire circumference, a part of the gas that is generated last during welding is left in the void 50. However, the distance between the first facing surface 10c and the second facing surface 40c of the void 50 in the axial direction is larger than the distance of the separation portion 60 in the axial direction. That is, a volume of the void 50 is overwhelmingly larger than a volume of the separation portion 60. Thus, a pressure load is not generated by the gas that slightly remains in the void 50. It is therefore possible to suppress a welding defect from occurring and it is possible to ensure a welding strength further satisfactorily.

After welding is performed, solidification contraction occurs in conjunction with the welding portion 70 being cooled. However, as illustrated in FIG. 2, the thickness D2 is larger than the thickness D1. Here, the thickness D2 is the minimum thickness in the axial direction, of the part in which the second facing surface 40c of the hollow disk-shaped portion 44 of the differential ring gear 40 is formed. The thickness D1 is the minimum thickness in the axial direction, of the part in which the first facing surface 10c of the flange portion 11 of the differential case 10 is formed. That is, the flange portion 11 has a lower rigidity than the hollow disk-shaped portion 44, the flange portion 11 is deformed toward the differential ring gear 40 side and thus, deformation of the differential ring gear 40 is prevented. In this way, the position accuracy of the differential ring gear 40 after welding is performed can be maintained satisfactorily, and it is possible to prevent the gear noise from increasing.

When the welding of the differential case 10 and the differential ring gear 40 is completed, the two pinion gears 17 and the side gears 15, 16 are inserted in the differential case 10, the pinion shaft 18 is inserted in the pinion gears 17, and the pin 19 is inserted so as to retain the pinion shaft 18 (see FIG. 1), that is, the differential mechanism 14 described above is installed in the differential case 10 (S5). In this way, the differential device 1 is completed. The differential device 1 is installed in the automatic transmission not shown (S6) and thus, the automatic transmission is completed.

[Summary of Embodiments]

As described above, a manufacturing method of a differential device (1), in which the differential device (1) includes:

a differential case (10) that houses a differential mechanism (14) drivingly coupled to an output shaft and that has a first abutting surface (10a) disposed so as to extend in an axial direction, a first welding surface (10d) disposed along an entire circumference, and a first facing surface (10c) disposed on a downstream side in an irradiating direction of an energy beam with respect to the first welding surface (10d) so as to extend along the entire circumference; and a differential ring gear (40) that is welded by the energy beam on an outer peripheral side of the differential case (10) and that has a second abutting surface (40a) disposed so as to extend in the axial direction, a second welding surface (40d) disposed along the entire circumference and disposed so as to face the first welding surface (10d), a second facing surface (40c) disposed on the downstream side in the irradiating direction with respect to the second welding surface (40d) so as to extend along the entire circumference and so as to face the first facing surface (10c), the manufacturing method of the differential device (1) includes:

an installing step (S3) of inserting the first abutting surface (10a) and the second abutting surface (40a) while relatively moving and inserting the first abutting surface (10a) and the second abutting surface (40a) in the axial direction, determining positions of the differential case (10) and the differential ring gear (40) in the axial direction, installing the differential case (10) and the differential ring gear (40) so that a separation portion (60) is formed so that the first welding surface (10d) and the second welding surface (40d) are spaced away from each other and is formed so as to have a non-linear portion (80) that has a non-linear shape in a section passing through an axial center, and installing the differential case (10) and the differential ring gear (40) so that a void (50) is formed between the first facing surface (10c) and the second facing surface (40c) that are spaced away from each other by a distance larger than that of the separation portion (60) and is in communication with the separation portion (60); and a welding step (S4) of irradiating the energy beam to the separation portion (60) and welding the first welding surface (10d) and the second welding surface (40d).

In this way, the separation portion 60 is formed between the first welding surface 10d and the second welding surface 40d, the void 50 that is in communication with the separation portion 60 is formed on the inner peripheral side of the separation portion 60, and the first welding surface 10d and the second welding surface 40d are welded. Thus, it is possible to cause the gas generated during welding to pass through the separation portion 60 from the void 50 to be discharged outside, prevent the gas from dissolving in the welding portion 70, and improve the welding quality. Suppose the energy beam is irradiated generally in parallel to the separation portion 60 for example. Even in such a case, it is possible to prevent the energy beam from passing through the separation portion 60 and hitting the first abutting surface 10a and the second abutting surface 40a, and make sure the energy beam stays in the separation portion 60 to ensure heat quantity. This is due to the separation portion 60 being formed to have a non-linear shape. It is thus possible to perform welding to the deep end of the separation portion 60 and ensure the welding strength.

In the manufacturing method of the differential device (1) described above, in the welding step (S4), an energy beam is irradiated to the separation portion (60) while a filler material is inserted in the separation portion (60), and the first welding surface (10d) and the second welding surface (40d) are welded while the separation portion (60) is filled.

In this way, it is possible to perform welding while the separation portion 60 in which the first welding surface 10d and the second welding surface 40d are spaced away from each other is filled with the filler material. Thus, it is possible to perform welding to the deep end of the separation portion 60 and ensure the welding strength.

In the manufacturing method of the differential device (1) described above, the first welding surface (10d) is formed so as to have a first planar portion (10f) that has a planar shape and that is provided on an upstream side in the irradiating direction with respect to the non-linear portion (80), the second welding surface (40d) is formed so as to have a second planar portion (400 that has a planar shape and that is provided on the upstream side in the irradiating direction with respect to the non-linear portion (80), and in the welding step (S4), an energy beam is irradiated so as to pass through between the first planar portion (10f) and the second planar portion (400 and hit the non-linear portion (80).

In this way, since the energy beam passes through between the first planar portion 10f and the second planar portion 40f and hits the non-linear portion 80, it is possible to perform welding to the deep end of the separation portion 60 and ensure the welding strength.

In the manufacturing method of the differential device (1) described above, the first welding surface (10d) is formed so as to have a first bent portion (10e) that is provided on the downstream side in the irradiating direction with respect to the first planar portion (100 and that is bent with respect to the first planar portion (100, the second welding surface (40d) is formed so as to have a second bent portion (40e) that is provided on the downstream side in the irradiating direction with respect to the second planar portion (400 and that is bent in the same direction as that of the first bent portion (10e) with respect to the second planar portion (400, and in the installing step (S3), positions of the differential case (10) and the differential ring gear (40) are determined in the axial direction so that the non-linear portion (80) is formed by the first bent portion (10e) and the second bent portion (40e).

The non-linear portion 80 is formed by the first bent portion 10e of the first welding surface 10d and the second bent portion 40e of the second welding surface 40d. It is thus possible to form the non-linear portion 80 more simply, compared to when the entirety of the first welding surface 10d and the second welding surface 40d are made into a curved surface. It is also possible to manage the distance over which the separation portion 60 is spaced more easily.

In the manufacturing method of the differential device (1) described above, one of or both of the first planar portion (10f) and the second planar portion (400 are formed so that a second distance (d2) over which the planar portion (100 and the second planar portion (400 on the upstream side are spaced away is larger than a first distance (d1) over which the planar portion (100 and the second planar portion (400 on the downstream side in the irradiating direction are spaced away.

Suppose there is a manufacturing error in the first welding surface 10d and the second welding surface 40d. Even in such a case, it is possible to prevent the upstream side in the irradiating direction of the energy beam from being blocked and insertion can be made easier when inserting a filler material, for example.

In the manufacturing method of the differential device (1) described above, the differential case (10) has a restricting portion (10b) that is formed so as to extend in a radial direction, and is formed so that the first welding surface (10d) faces the radial direction, the differential ring gear (40) has an abutting portion (40b) that is formed so as to extend in the radial direction and that is configured to abut against the restricting portion (10b), and is formed so that the second welding surface (40d) faces the radial direction, and in the installing step (S3), when positions of the differential case (10) and the differential ring gear (40) are determined in the axial direction, the abutting portion (40b) of the differential ring gear (40) is abutted against the restricting portion (10b) of the differential case (10) so as to restrict the positions and a distance between the first welding surface (10d) and the second welding surface (40d) is restricted so as to form the separation portion (60).

In this way, by just abutting the abutting portion 40b of the differential ring gear 40 against the restricting portion 10b of the differential case 10, it is possible to determine the positions of the differential case 10 and the differential ring gear 40 in the axial direction and determine the positions of the first welding surface 10d and the second welding surface 40d in the axial direction at the same time, that is, it is possible to perform the distance over which the separation portion 60 is spaced at the same time.

In the manufacturing method of the differential device (1) described above, the differential case (10) has a flange portion (11) that is formed on an opposite side of the restricting portion (10b) from the first abutting surface (10a) in the axial direction so as to extend in a flange shape toward the outer peripheral side, and the first welding surface (10d) is formed on a distal end portion of the flange portion (11).

It is thus possible to dispose the welding portion 70 on the outer peripheral side of the restricting portion, dispose the irradiator that irradiates the energy beam to the outer peripheral side, and prevent interference of the irradiator and the differential case 10.

In the manufacturing method of the differential device (1) described above, the differential ring gear (40) has a hollow disk-shaped portion (44) that is formed to have a hollow disk shape so as to include the second abutting surface (40a) on an end portion on an inner peripheral side and a tooth surface (41) on an end portion on an outer peripheral side, and an extending portion (42) that is formed so as to extend from the hollow disk-shaped portion (44) in the axial direction, and the second welding surface (40d) is formed on a distal end portion of the extending portion (42).

It is thus possible to dispose the welding portion 70 at a position away from the hollow disk-shaped portion 44 of the differential ring gear 40 and it is possible to decrease the effect of a thermal strain on the tooth surface 41.

[Other Possible Embodiments]

In the embodiment described above, the stepped restricting portion 10b is provided in the differential case 10 and the abutting portion 40b of the differential ring gear 40 is abutted so as to determine the relative positions of the differential case 10 and the differential ring gear 40 in the axial direction. However, the configuration is not limited to this. For example, the method of determining the relative positions in the axial direction may be any method, such as fixing with a jig or providing a key and a key groove as a means of determining positions.

In the embodiment, the configuration in which the first welding surface 10d and the second welding surface 40d are inclined with respect to the radial direction that is perpendicular to the axial direction is described. This is for avoiding interference of the irradiator 90 of the laser and the differential ring gear 40. If interference resulting from the shape of the differential ring gear 40 or the differential case 10 does not occur, the first welding surface 10d and the second welding surface 40d may be disposed along the radial direction that is perpendicular to the axial direction.

In the embodiment, the case in which a laser is used as the energy beam is described. However, the beam is not limited to this. The beam maybe any beam that can irradiate a high-energy beam and perform welding, such as an electron beam.

In the embodiment, the case in which the non-linear portion 80 provided in the separation portion 60 is formed by the first bent portion 10e and the second bent portion 40e is described. However, the non-linear portion 80 is not limited to this. The non-linear portion 80 may have a curved shape or a labyrinth shape in the section view, that is, the non-linear portion 80 only needs to have a non-linear shape in which the energy beam does not pass through.

In the embodiment, the first facing surface 10c that has an arc concave shape is described. However, the first facing surface 10c is not limited to this, and may have any shape as long as the thickness of the flange portion 11 can be decreased. The second facing surface 40c that uses a part of the side face of the hollow disk-shaped portion 44 and that has a planar shape extending in the radial direction. However, the second facing surface 40c is not limited to this, and may have a shape that is expanded to the flange portion 11 side. That is, the second facing surface 40c only needs to have a shape in which the rigidity of the hollow disk-shaped portion 44 in the axial direction is higher than the rigidity of the flange portion 11 in the axial direction.

In the embodiment, the differential ring gear 40 that has the tooth portion 43 in which the tooth surface is formed and the hollow disk-shaped portion 44 in which the inner peripheral side of the hollow disk-shaped portion 44 serves as the second abutting surface 40a is described. However, the differential ring gear 40 is not limited to this, and a boss portion that has a boss shape may be provided on the inner peripheral side of the hollow disk-shaped portion 44 and the second abutting surface may be provided on the inner peripheral side of the boss portion.

The differential device 1 according to the embodiment that is suitable for a FF type vehicle is described. However, the differential device 1 is not limited to this, and may be a differential device that is provided in a FR (front engine, rear drive) type vehicle in which the output shaft is placed longitudinally with respect to the vehicle traveling direction, and that is connected to a propeller shaft that is connected to the automatic transmission. In addition, the differential device 1 may be a differential device that is a so-called center differential device that distributes a rotation of the engine to front and rear wheels in a four-wheel-drive vehicle.

In the embodiment, the differential device installed in the automatic transmission that shifts the rotation of the engine is described. However, the differential device is not limited to this, and can be installed in a hybrid vehicle in which an engine and a motor-generator are installed or an electric vehicle in which only a motor-generator is installed.

In the embodiment, the differential mechanism that includes the pinion gear and the pair of side gears is described. However, the differential mechanism is not limited to this, and only needs to be a mechanism that absorbs a differential rotation of a pair of output shafts with a friction plate, a screw, and a one-way clutch etc. That is, the differential mechanism may have any structure.

In the embodiment, the differential case 10 that is an integrated case and in which the differential mechanism 14 is installed from the opening portion not shown is described. However, the differential case is not limited to this, and may be configured of two parts, namely a case body and a cover, and is integrated as a differential case by welding etc. after the differential mechanism is installed.

INDUSTRIAL APPLICABILITY

The manufacturing method of the differential device can be used for a vehicular transmission apparatus such as an automatic transmission or a hybrid drive device, and is preferably used when manufacturing a differential device in which the welding quality needs to be improved.

Description of the Reference Numerals

1 Differential device
10 Differential case
10a First abutting surface
10b Restricting portion
10c First facing surface
10d First welding surface
10e First bent portion
10f First planar portion
11 Flange portion
14 Differential mechanism
40 Differential ring gear
40a Second abutting surface
40b Abutting portion
40c Second facing surface
40d Second welding surface
40e Second bent portion
40f Second planar portion
41 Tooth surface
42 Extending portion
44 Hollow disk-shaped portion
50 Void
60 Separation portion
80 Non-linear portion
S1 Differential case forming step
S2 Differential ring gear forming step
S3 Installing step
S4 Welding step
d1 First distance
d2 Second distance

The invention claimed is:

1. A manufacturing method of a differential device, the differential device including:
   a differential case that houses a differential mechanism drivingly coupled to an output shaft and that has a first abutting surface disposed so as to extend in an axial direction, a first welding surface disposed along an entire circumference, and a first facing surface disposed on a downstream side in an irradiating direction of an energy beam with respect to the first welding surface so as to extend along the entire circumference; and
   a differential ring gear that is welded by the energy beam on an outer peripheral side of the differential case and that has a second abutting surface disposed so as to extend in the axial direction, a second welding surface disposed along the entire circumference and disposed so as to face the first welding surface, a second facing surface disposed on the downstream side in the irradiating direction with respect to the second welding surface so as to extend along the entire circumference and face the first facing surface, the manufacturing method of the differential device comprising:
   an installing step of inserting the first abutting surface and the second abutting surface while relatively moving the first abutting surface and the second abutting surface in the axial direction, determining positions of the differential case and the differential ring gear in the axial direction, installing the differential case and the differential ring gear so that a separation portion is formed so that the first welding surface and the second welding surface are spaced away from each other and so as to have a non-linear portion that has a non-linear shape in a section passing through an axial center of the energy beam, and installing the differential case and the differential ring gear so that a void is formed between the first facing surface and the second facing surface that are spaced away from each other by a distance larger than that of the separation portion and is in communication with the separation portion; and
   a welding step of irradiating the energy beam to the separation portion and welding the first welding surface and the second welding surface.

2. The manufacturing method of a differential device according to claim 1, wherein in the welding step, an energy beam is irradiated to the separation portion while a filler material is inserted in the separation portion, and the first welding surface and the second welding surface are welded while the separation portion is filled.

3. The manufacturing method of a differential device according to claim 1, wherein
   the first welding surface is formed so as to have a first planar portion that has a planar shape and that is provided on an upstream side in the irradiating direction with respect to the non-linear portion,
   the second welding surface is formed so as to have a second planar portion that has a planar shape and that is provided on the upstream side in the irradiating direction with respect to the non-linear portion, and
   in the welding step, an energy beam is irradiated so as to pass through between the first planar portion and the second planar portion and hit the non-linear portion.

4. The manufacturing method of a differential device according to claim 3, wherein
   the first welding surface is formed to have a first bent portion that is provided on the downstream side in the irradiating direction with respect to the first planar portion and that is bent with respect to the first planar portion,
   the second welding surface is formed so as to have a second bent portion that is provided on the downstream side in the irradiating direction with respect to the second planar portion and that is bent in the same direction as that of the first bent portion with respect to the second planar portion, and
   in the installing step, positions of the differential case and the differential ring gear are determined in the axial direction so that the non-linear portion is formed by the first bent portion and the second bent portion.

5. The manufacturing method of a differential device according to claim 3, wherein one or both of the first planar portion and the second planar portion are formed so that a second distance over which the first planar portion and the second planar portion on the upstream side are spaced away is larger than a first distance over which the first planar portion and the second planar portion on the downstream side in the irradiating direction are spaced away.

6. The manufacturing method of a differential device according to claim 1, wherein
the differential case has a restricting portion that is formed so as to extend in a radial direction, and is formed so that the first welding surface faces the radial direction,
the differential ring gear has an abutting portion that is formed so as to extend in the radial direction and that is configured to abut against the restricting portion, and is formed so that the second welding surface faces the radial direction, and
in the installing step, when positions of the differential case and the differential ring gear are determined in the axial direction, the abutting portion of the differential ring gear is abutted against the restricting portion of the differential case so as to restrict the positions and a distance between the first welding surface and the second welding surface is restricted so as to form the separation portion.

7. The manufacturing method of a differential device according to claim 6, wherein the differential case has a flange portion that is formed on an opposite side of the restricting portion from the first abutting surface in the axial direction so as to extend in a flange shape toward the outer peripheral side, and the first welding surface is formed on a distal end portion of the flange portion.

8. The manufacturing method of a differential device according to claim 6, wherein the differential ring gear has a hollow disk-shaped portion that is formed to have a hollow disk shape so as to include the second abutting surface on an end portion on an inner peripheral side and a tooth surface on an end portion on an outer peripheral side, and an extending portion that is formed so as to extend from the hollow disk-shaped portion in the axial direction, and the second welding surface is formed on a distal end portion of the extending portion.

* * * * *